United States Patent
Ikeda et al.

(10) Patent No.: US 8,930,976 B2
(45) Date of Patent: Jan. 6, 2015

(54) CONTEXT-BASED AUTOMATIC SELECTION OF FACTOR FOR USE IN ESTIMATING CHARACTERISTICS OF VIEWERS VIEWING SAME CONTENT

(75) Inventors: Kazushi Ikeda, Saitama (JP); Gen Hattori, Saitama (JP); Kazunori Matsumoto, Saitama (JP); Chihiro Ono, Saitama (JP)

(73) Assignee: KDDI Corporation, Tokyo (JP)

( * ) Notice: Subject to any disclaimer, the term of this patent is extended or adjusted under 35 U.S.C. 154(b) by 640 days.

(21) Appl. No.: 13/222,613

(22) Filed: Aug. 31, 2011

(65) Prior Publication Data
US 2012/0072937 A1    Mar. 22, 2012

(30) Foreign Application Priority Data
Sep. 21, 2010  (JP) ................................ 2010-210587

(51) Int. Cl.
| | |
|---|---|
| H04N 7/16 | (2011.01) |
| H04H 60/33 | (2008.01) |
| G06F 17/30 | (2006.01) |
| H04N 21/41 | (2011.01) |
| H04N 21/4788 | (2011.01) |

(52) U.S. Cl.
CPC ...... *G06F 17/30038* (2013.01); *H04N 21/4126* (2013.01); *H04N 21/4788* (2013.01)
USPC ........ 725/10; 725/9; 725/11; 725/12; 725/13; 725/14; 725/15; 725/16; 725/17; 725/18; 725/19; 725/20; 725/21; 725/34; 725/35; 725/46

(58) Field of Classification Search
CPC .................... H04N 21/44222; H04N 21/4532; H04N 21/25883; H04H 60/45–60/48
USPC ...................... 725/9–21, 34–35, 46
See application file for complete search history.

(56) References Cited

U.S. PATENT DOCUMENTS

| | | | |
|---|---|---|---|
| 2008/0215589 A1* | 9/2008 | Elhaik ............................ | 707/10 |
| 2009/0228424 A1* | 9/2009 | Mori et al. ..................... | 706/54 |
| 2010/0191689 A1* | 7/2010 | Cortes et al. ................... | 706/46 |

FOREIGN PATENT DOCUMENTS

| | | |
|---|---|---|
| JP | A-2008-48297 | 2/2008 |
| JP | A-2010-87658 | 4/2010 |

OTHER PUBLICATIONS

Ohkura et al., "Scalable and General Method to Estimate Blogger Profile," Information Processing Society in Japan, Sep. 25, 2007, pp. 1-6, vol. 94 (with Abstract).

* cited by examiner

*Primary Examiner* — Yassin Alata
(74) *Attorney, Agent, or Firm* — Oliff PLC (57) ABSTRACT

A method of selecting a factor for estimating characteristics of viewers who view a same content is disclosed. This method includes: storing a multi-layered hierarchal list of attribute words expressing viewer attributes, each of which is a candidate of the factor; extracting the attribute words from the same content; generating a first vector indicative of frequencies with which the attribute words occur in the same content; for a successively-selected one of the attribute words, successively generating a second vector indicative of frequencies with which the attribute words occur in ones of sets of learned-text information which contain the successively-selected attribute word; calculating a similarity score between the vectors on a per-attribute-word basis; and selecting one of the attribute words as the factor, which is associated with subordinate attribute words on a lower layer, based on a dispersion level of the similarity scores calculated for the subordinate attribute words.

15 Claims, 7 Drawing Sheets

CONTEXT-BASED AUTOMATIC SELECTION OF FACTOR FOR USE IN ESTIMATING CHARACTERISTICS OF VIEWERS VIEWING SAME CONTENT

CROSS-REFERENCE TO RELATED APPLICATIONS

This application claims the priority benefit of Japanese Patent Application No. 2010-210587, filed Sep. 21, 2010, the content of which is incorporated herein by reference in its entirety.

BACKGROUND OF THE INVENTION

1. Field of the Invention

The invention relates generally to techniques of automatically selecting a factor (e.g., a demographic attribute, a demographic criterion, a demographic class) for use in estimating characteristics of viewers (i.e., an audience) who are viewing the same content (e.g., broadcast content, Web content).

The invention relates more specifically to techniques that can be implemented in an exemplary environment in which a user equipment (e.g., a mobile terminal, a PC (Personal Computer)) can receive and visualize the same shared content that has been distributed to other viewers (e.g., an unspecified large number of other viewers), and can receive and visualize comments that have been published or posted by the other viewers.

2. Description of the Related Art

In recent years, it has become more popular that various kinds of shared content are distributed via a global network such as the Internet to the users. Such shared content, which includes, for example, television broadcasts, and various kinds of media content such as Web pages, music content, visual or video content, and e-books, refers to content accessible from users.

Such shared content is epitomized by broadcast content which is formatted to include not only audiovisual information which serves as a broadcast program, but also various sets of additional information useful to users. Notably, a set of such additional information is textual information including, for example, subtitles, captions and the like, which is displayed to viewers in synchronization with the audiovisual information, while helping the viewers in understanding the context of the broadcast program that the viewers are viewing.

Typically, such textual information is prepared for summarizing the context of the broadcast program, using a short message, document or text. To this end, the short message is made up with words selected to concisely the context of the audiovisual information. Because of this, analysis of frequencies with which important words or keywords appear in the short message would be helpful in successful interpretation of the context of the broadcast program.

On the other hand, a growing number of users (e.g., an unspecified large number of other viewers) publish or post a growing number of comments via the Internet to sites such as a blog (Web log) site, a mini blog site (e.g., Twitter (registered trademark)) or the like. Such comments are featured in that they tend to share the same topic or subject. One example of such shared topic can is shared content distributed to users, one example of which can be broadcast television content (e.g., broadcast television programs).

While viewing shared content such as broadcast content, users can discuss the context of the broadcast content with other viewers, through, for example, a mini blog site. Notably, it is a growing viewing style that users, while viewing a television broadcast (e.g., a live broadcast program of a professional baseball game), post their comments on the context of the television broadcast (e.g., cheering or criticizing messages on the baseball game). This viewing style helps each individual user to feel that he or she, when viewing, shares the same content with other viewers.

There is a known technique regarding such a communication service. By this technique, distinctive keywords are automatically extracted from a text part (e.g., subtitles, captions) of broadcast television content, an Web page containing a text using the same words as the extracted keywords is retrieved from an associated Web site, and the retrieved Web page is presented to a user. This is disclosed in, for example, Japanese Patent Application Publication Nos. 2010-087658 and 2008-048297, the contents of which are incorporated herein by reference in their entirety.

There is another known technique of estimating a blogger profile (i.e., a collection of personal data associated to a specific user or individual bearing some attributes) by analyzing text data which is authored and posted to a blog site by the blogger. This technique enables estimation of a blogger profile based on an unspecified factor or a set of unspecified attributes. This is disclosed in Article "Scalable and General Method to Estimate Blogger Profile" co-authored by Tsutomu OHKURA, Nobuyuki SHIMIZU, and Hiroshi NAKAGAWA, Sep. 25, 2007, Information Processing Society in Japan, Natural Language, Special Interest Group, Technical Report 2007 (94), pp. 1-5, the content of which is incorporated herein by reference in its entirety.

BRIEF SUMMARY OF THE INVENTION

The conventional technique disclosed in the aforementioned Japanese Patent Application Publication No. 2010-087658 can retrieve an Web page relevant to broadcast content that a subject viewer is watching, and present the retrieved Web page to the subject viewer.

This technique, however, cannot retrieve only comments made by other viewers who are watching the same broadcast content as the subject viewer is watching.

In addition, even if a modification is made to this technique to retrieve the other viewers' comments, the modification could not reach a technique of estimating the other viewers' characteristics, as long as only a known type of a site such as a mini blog site is used as such.

The technique disclosed in the aforementioned Article "Scalable and General Method to Estimate blogger Profile" can estimate a blogger's profile (e.g., the blogger's characteristics constituted by a plurality of attributes, such as age, gender, occupation, hobbies), from a comment made by the blogger.

This technique, however, cannot work successfully in a hypothetical scenario in which a plurality of viewers, while watching broadcast content, write and post their comments. The reasons is that this technique cannot select one of a plurality of the viewers' attributes as a factor for use in estimating the viewers' characteristics, so that the factor can reflect the context of the broadcast content, for example, so that the factor can be one of the viewers' attributes that is substantially the most attractive to the viewers.

More specifically, if this technique is implemented in the above-mentioned scenario, it is likely that "Age (ages of viewers)" is selected as the factor. If the broadcast content is attractive to the viewers whether young or old (i.e., without depending on their ages), analysis of the viewers' characteristic based on "Age" and presentation of the analysis results to the viewers will not be helpful or interesting to the viewers.

In view of the foregoing, it would be desirable to automatically select one of attributes of viewers who are watching the same content, as a factor for use in estimating the viewers' characteristics, so as to reflect the context of the same content.

According to a first aspect of the invention, a method is provided of selecting an optimum factor for use in estimating characteristics of a plurality of viewers who view a same content.

This method comprises:

storing a multi-layered hierarchal factor-list of a plurality of pre-selected factors each of which is a candidate of the optimum factor, the factors being a plurality of attribute words which express attributes of the viewers, the factor list having a plurality of layers;

storing a plurality of sets of learned-text information which are relevant to the plurality of attribute words, in sections, on a per-attribute-word basis;

extracting a plurality of keywords from the same content;

generating a first vector indicative of frequencies with which the plurality of keywords occur in the same content, the first vector having a plurality of elements which the plurality of keywords are allocated, respectively, the elements having values indicative of the frequencies of the plurality of keywords, respectively;

for a successively-selected one of the keywords, successively generating a second vector indicative of frequencies with which the plurality of keywords occur in ones of the plurality of sets of learned-text information which ones contain an attribute word identical with the successively-selected keyword, the second vector having a plurality of elements which the plurality of keywords are allocated, respectively, the elements having values indicative of the frequencies of the plurality of keywords, respectively;

calculating a similarity score between the first and second vectors on a per-keyword basis; and on a per-layer basis, selecting one of the plurality of factors as the optimum factor, wherein the one factor is associated with a sub-plurality of attribute words, which are on a lower layer than that of the one factor, and which are coincident with at least some of the plurality of keywords, so that a dispersion level indicative of how the similarity scores calculated for the sub-plurality of attribute words are dispersed therewithin can be substantially the maximum among the plurality of factors on the same layer, and selecting the sub-plurality of attribute words as optimum attribute words for the optimum factor.

According to a second aspect of the invention, the apparatus is provided for selecting an optimum factor for use in estimating characteristics of a plurality of viewers who view a same content.

This apparatus comprises:

a factor-list storage device for storing therein a multi-layered hierarchal factor-list of a plurality of pre-selected factors each of which is a candidate of the optimum factor, the factors being a plurality of attribute words which express attributes of the viewers, the factor list having a plurality of layers;

a learned-text storage device for storing therein a plurality of sets of learned-text information which are relevant to the plurality of attribute words, in sections, on a per-attribute-word basis;

an extractor configured to extract a plurality of keywords from the same content;

a first-vector generator configured to generate a first vector indicative of frequencies with which the plurality of keywords occur in the same content, the first vector having a plurality of elements which the plurality of keywords are allocated, respectively, the elements having values indicative of the frequencies of the plurality of keywords, respectively;

a second-vector generator configured to operate for a successively-selected one of the keywords, to successively generate a second vector indicative of frequencies with which the plurality of keywords occur in ones of the plurality of sets of learned-text information which ones contain an attribute word identical with the successively-selected keyword, the second vector having a plurality of elements which the plurality of keywords are allocated, respectively, the elements having values indicative of the frequencies of the plurality of keywords, respectively;

a similarity calculator configured to calculate a similarity score between the first and second vectors on a per-keyword basis; and an optimum-factor selector configured to select, on a per-layer basis, one of the plurality of factors as the optimum factor, wherein the one factor is associated with a sub-plurality of attribute words, which are on a lower layer than that of the one factor, and which are coincident with at least some of the plurality of keywords, so that a dispersion level indicative of how the similarity scores calculated for the sub-plurality of attribute words are dispersed therewithin can be substantially the maximum among the plurality of factors on the same layer, and selecting the sub-plurality of attribute words as optimum attribute words for the optimum factor.

According to a third aspect of the invention, a method of selecting an optimum factor for estimating characteristics of viewers who view a same content is provided.

This method comprises:

storing a multi-layered hierarchal list of pre-selected attribute words expressing viewer attributes, each of which is a candidate of the optimum factor;

extracting the attribute words from the same content;

generating a first vector indicative of frequencies with which the attribute words occur in the same content;

for a successively-selected one of the attribute words, successively generating a second vector indicative of frequencies with which the attribute words occur in ones of sets of learned-text information which contain the successively-selected attribute word;

calculating a similarity score between the first and second vectors on a per-attribute-word basis; and selecting one of the attribute words as the optimum factor, which is associated with subordinate attribute words on a lower layer than that of the one attribute word, based on a dispersion level indicative of how the similarity scores calculated for the subordinate attribute words are dispersed within the subordinate attribute words.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

According to the invention, the following modes are provided as illustrative embodiments of the invention:

According to a first mode of the invention, there is provided the method according to the first or third aspect of the invention, wherein the calculating includes calculating the similarity score by normalizing an inner product of the first and second vectors, in the form of a cosine of an angle between the first and second vectors.

According to a second mode of the invention, there is provided the method according to the first or third aspect or the first mode of the invention, wherein the extracting includes performing morphological analysis for a text part of the same content, to thereby extract the plurality of keywords from the text part, and optionally includes calculating a TF-IDF (Term Frequency-Inverse Document Frequency) score for each of the extracted key words, to thereby select at least one of the extracted keywords which is more distinct from any other keyword, each as a final keyword.

According to a third mode of the invention, there is provided the method according to any one of the first and third aspects, the first and second modes of the invention, wherein the same content is broadcast television content having an audiovisual part and a text part contextually relevant to the audiovisual part, and the extracting includes extracting the plurality of keywords from the text part.

According to a fourth mode of the invention, there is provided the method according to any one of the first and third aspects, the first through third modes of the invention, further comprising:

at time intervals, collecting a plurality of comments which were published by the plurality of viewers acting also as publishers, which comments are relevant to the context of the same content, and each of which comments is associated with a unique publisher identifier (ID);

collecting the plurality of comments such that the comments are sorted by the publisher ID; and extracting some of the plurality of attribute words from the plurality of comments, on a per-publisher-ID basis; and at time intervals, for a successively-selected one of the plurality of attribute words, calculating as a publisher number, a number of ones of the publishers who published ones of the plurality of comments which contain the successively-selected attribute word, wherein the selecting includes selecting one of the plurality of factors as the optimum factor, wherein each factor is associated with a sub-plurality of attribute words, which are on a lower layer than that of the each factor, and which are coincident with at least some of the plurality of keywords, based on a dispersion level indicative of how the similarity scores calculated for the sub-plurality of attribute words for each factor are dispersed therewithin can be substantially maximized, and temporal changes in the publisher numbers calculated for the sub-plurality of attribute words for each factor.

According to a fifth mode of the invention, there is provided the method according to any one of the first and third aspects, the first through fourth modes of the invention, further comprising:

collecting a plurality of comments which were published by the plurality of viewers acting also as publishers, which comments are relevant to the context of the same content, and each of which comments is identified by a unique publisher identifier (ID);

collecting the plurality of comments such that the comments are sorted by the publisher ID;

extracting some of the plurality of attribute words from the plurality of comments on a per-publisher-ID basis;

for a successively-selected one of the optimum attribute words, calculating as a viewer number, a number of ones of the publishers who published ones of the plurality of comments which contain the successively-selected optimum attribute word; and based on the calculated viewer numbers, calculating proportions of segments into which the plurality of viewers are segmented based on the optimum factor, to thereby estimate characteristics of the plurality of viewers.

According to a sixth mode of the invention, there is provided the method according to the fifth mode of the invention, wherein the lower layer is one of the plurality of layers which is one step lower than that of the optimum factor in the hierarchy.

According to a seventh mode of the invention, there is provided the method according to the fifth or sixth mode of the invention, wherein the plurality of comments are comments sent to a mini blog (Web log) site, and the collecting a plurality of comments and the collecting the plurality of comments each include collecting the plurality of comments from the mini blog site.

According to an eighth mode of the invention, there is provided the method according to the seventh mode of the invention, wherein the collecting the plurality of comments includes tracing back and collecting additional previous comments which were made by the same publishers.

According to a ninth mode of the invention, there is provided the method according to the eighth mode of the invention, wherein the sets of learned-text information include a plurality of comments, the comments are relevant or irrelevant to the same content, the comments are identified by the corresponding respective publisher IDs, the comments are sent to the mini blog site, the comments are associated with profiles of the corresponding respective publishers, the associated profiles are identified by the corresponding respective publisher IDs, and the storing a plurality of sets of learned-text information includes:

collecting the plurality of comments with the associated profiles, the comments and the associated profiles being identified by the corresponding respective publisher IDs;

extracting the plurality of attribute words from the profiles; and storing the comments in association with the extracted attribute words from the corresponding associated profiles, as the sets of learned-text information.

According to a tenth mode of the invention, there is provided the method according to any one of the first and third aspects, the first through ninth modes of the invention, wherein the factor list is configured such that a single-parent node on one of the layers, and sibling child nodes which share the single-parent node, and which are on one step lower layer than that of the single-parent node, together constitute a single parent-child relationship, and such that sibling child nodes in each parent-child relationship together constitute a single attribute class, the selecting includes selecting an optimum attribute class from a plurality of attribute classes, on a per-layer basis, the optimum attribute class is constituted by sibling child nodes, which are allocated attribute words that are coincident with at least some of the plurality of keywords, and which has substantially the maximum dispersion level of the similarity scores among a plurality of attribute classes on a same layer as that of the optimum attribute class, and the selecting further includes selecting one of the plurality of factors in the factor list, which is allocated to a single-parent node shared by sibling child nodes which together constitute the optimum attribute class.

According to an eleventh mode of the invention, there is provided a computer-readable non-transitory storage medium having stored therein a program which, when executed by a computer, effects the method according to any one of the first and third aspects, the first through tenth modes of the invention.

The "storage medium" may be embodied in any one of a variety of types, including a magnetic recording medium such as a flexible-disc, an optical recording medium such as a CD and a CD-ROM, an optical-magnetic recording medium such as an MO, an un-removable storage such as a ROM, for example.

Several presently preferred embodiments of the invention will be described in more detail by reference to the drawings in which like numerals are used to indicate like elements throughout.

Figure 1:
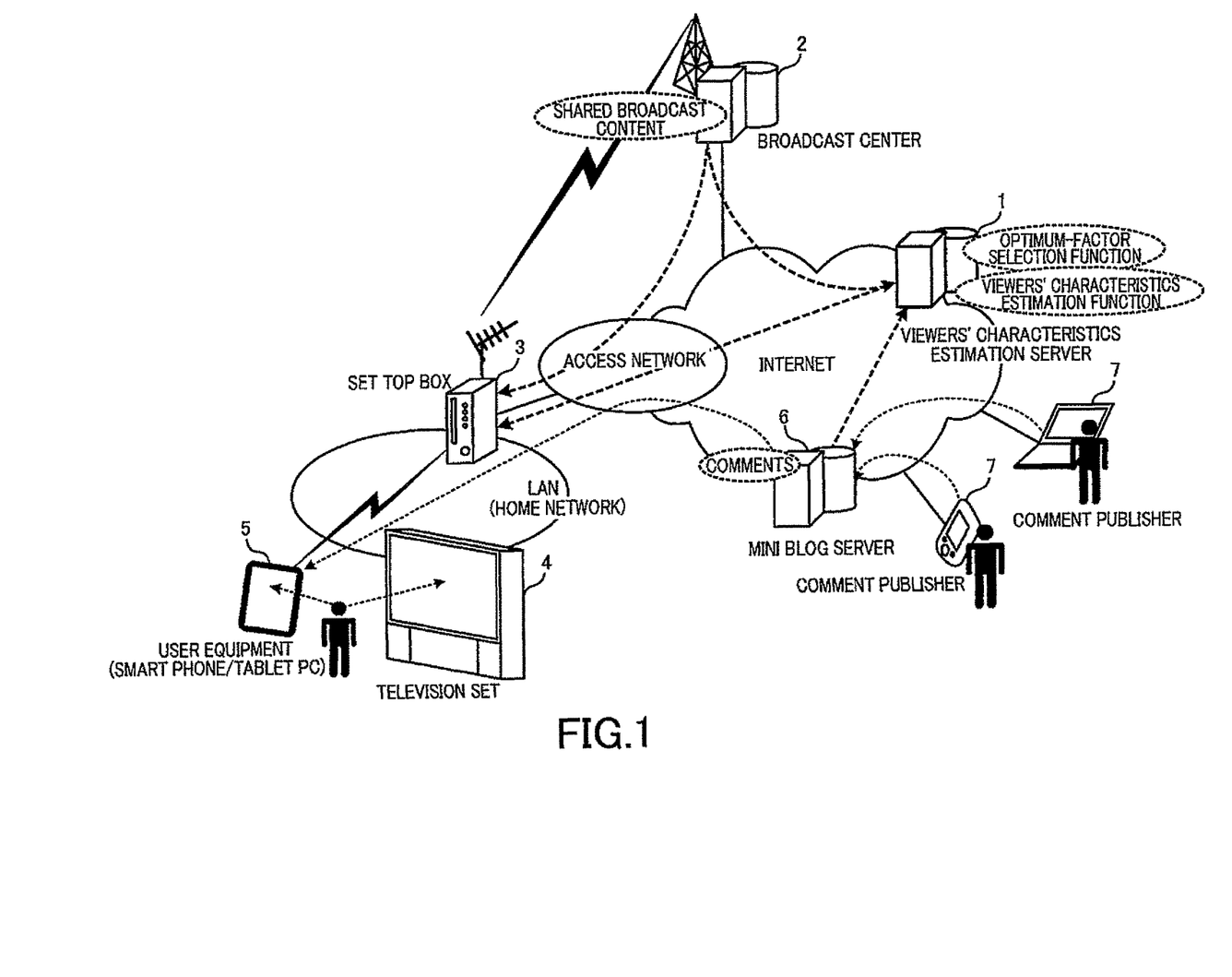
FIG. 1 is a schematic diagram conceptually illustrating a system according to a first illustrative embodiment of the present invention.

FIG. 1 is a schematic diagram conceptually illustrating a system according to a first illustrative embodiment of the present invention.

In this system, there are some associated networks (including an airwave broadcast network) which connect together a viewers' characteristics estimation (VCE) server 1; a broadcast center 2; a portable user equipment 5 which is used by a user who is a viewer of broadcast content which has been broadcast from the broadcast center 2; and general-purpose data terminals 7 which allow other viewers who are watching the same broadcast content (i.e., exemplary shared content), to publish or post their comments.

As illustrated in FIG. 1, a set top box 3 is installed in the user's home. The set top box 3 is connected with the Internet via an access network. The set top box 3 is configured to receive a signal indicative of broadcast content (i.e., exemplary content shared between viewers) which has been broadcast from the broadcast center 2.

Such content is distributed to, for example, an unspecified large number of viewers. Such content can include broadcast content distributed in air wave or a broadcast signal, which is received at the user equipment 5 through its antenna, and content which is received at the user equipment 5 via the Internet or CATV cables.

It is noted that, in the following context, the term "shared content" will be used to refer to shared content which is distributed to an unspecified large number of viewers, but is not exclusive. An alternative type of shared content may be, for example, any kind of media content which is distributed from an Web site (which belongs to a notion "broadcast center" in a broad sense).

In this context, broadcast content is, for example, a digital broadcast program, which is distributed by terrestrial digital broadcasting, one-segment broadcasting, or satellite broadcasting (BS). In any event, such type of broadcast content basically contains not only audiovisual information, but also textual information (including subtitles, captions, and any other type of text contained in broadcast content).

As illustrated in FIG. 1, the set top box 3 is also connected with a television set 4 and the user equipment 5, via a LAN (Local Area Network), which is one exemplary home network within the user's home.

The user equipment 5 is, for example, in the form of a tablet PC (Personal Computer), a smart phone, etc., and typically, can communicate with the set top box 3 via a wireless LAN. The user equipment 5 can also communicate with various external servers, with the user equipment 5 connected with the Internet.

The television set 4 is configured to receive broadcast content from the set top box 3, and plays back the received content. The user can view and listen to the broadcast content played back by the television set 4, and also can obtain various information through the user equipment 5 as a result of the user's operation for the user equipment 5.

As illustrated in FIG. 1, a mini blog (Web log) server 6 is connected with the Internet. The mini blog server 6, which can be, for example, a Twitter (registered trademark) server, receives comments from an unspecified large number of publishers (i.e., comment senders or generators).

The user operates the user equipment 5 for access to the mini blog server 6, to thereby view or browse comments which an unspecified large number of publishers have published.

In an exemplary scenario, the user, while viewing broadcast content through the television set 4, can view or browse through the user equipment 5, comments which other viewers viewing the same broadcast content have published, and which are contextually relevant to the same broadcast content.

As illustrated in FIG. 1, the VCE server 1 is also connected with the Internet. The VCE server 1 is configured to receive broadcast content from the broadcast center 2, and collects comments relevant to the same broadcast content from the mini blog server 46.

Generally speaking, the VCE server 1 is configured to have an "optimum-factor selection function" of selecting one of a plurality of candidate factors as an optimum factor (e.g., a demographic attribute, a demographic criteria, or a demographic class), by analyzing the context of the broadcast content; and a "viewers' characteristics estimation function" of estimating characteristics (e.g., a demographic distribution for a specific demographic attribute of interest) of viewers who are watching the same broadcast content, by analyzing the context of the viewers' comments, based on the optimum factor.

More specifically, when the "optimum-factor selection function" is provided, one is selected as an optimum factor from a plurality of attributes (or attribute items) of the other viewers, so that the one attribute can be optimum or best suitable as a factor based on which the other viewers are classified into groups, or which an audience formed by the other viewers is segmented into segments, for content shared between viewers (including the user and other viewers) who are interested in the shared content and who are viewing the same content simultaneously.

Still more specifically, when the "optimum-factor selection function" is provided, a similarity score (e.g., a cosine similarity) is calculated, for each of keywords contained in the shared content, which refers to a measurement of similarity between a text part of the shared content, and a plurality of sets of learned-text information (e.g., phrases, sentences or paragraphs) which are relevant to the same keywords; and one is selected as an optimum factor from the plurality of factors, based on the calculated similarity scores, so that the one factor is best suitable in analyzing the other viewers' comments relevant to the shared content.

With selection of the optimum factor, some of the attribute words belonging or subordinate to the optimum factor are selected as optimum attribute words.

On the other hand, when the "viewers' characteristics estimation function" is provided, a plurality of comments that other viewers viewing the shared content have published are collected from the mini blog server 6, and the collected comments are contextually analyzed based on the optimum factor, in order to segment the other viewers or the audience into segments based on the optimum factor, to thereby estimate the audience's characteristics.

More specifically, when the "viewers' characteristics estimation function" is provided, the audience is divided into segments based on the optimum factor, to thereby calculate the proportions of the segments of the audience, which indicate how many viewers of the audience belong to each segment.

In response to a request issued from the user equipment 5 which is owned and operated by the user, the VCE server 1 transmits information on the proportions of the segments, which servers as viewers' characteristics information, to the user equipment 5.

Figure 2:
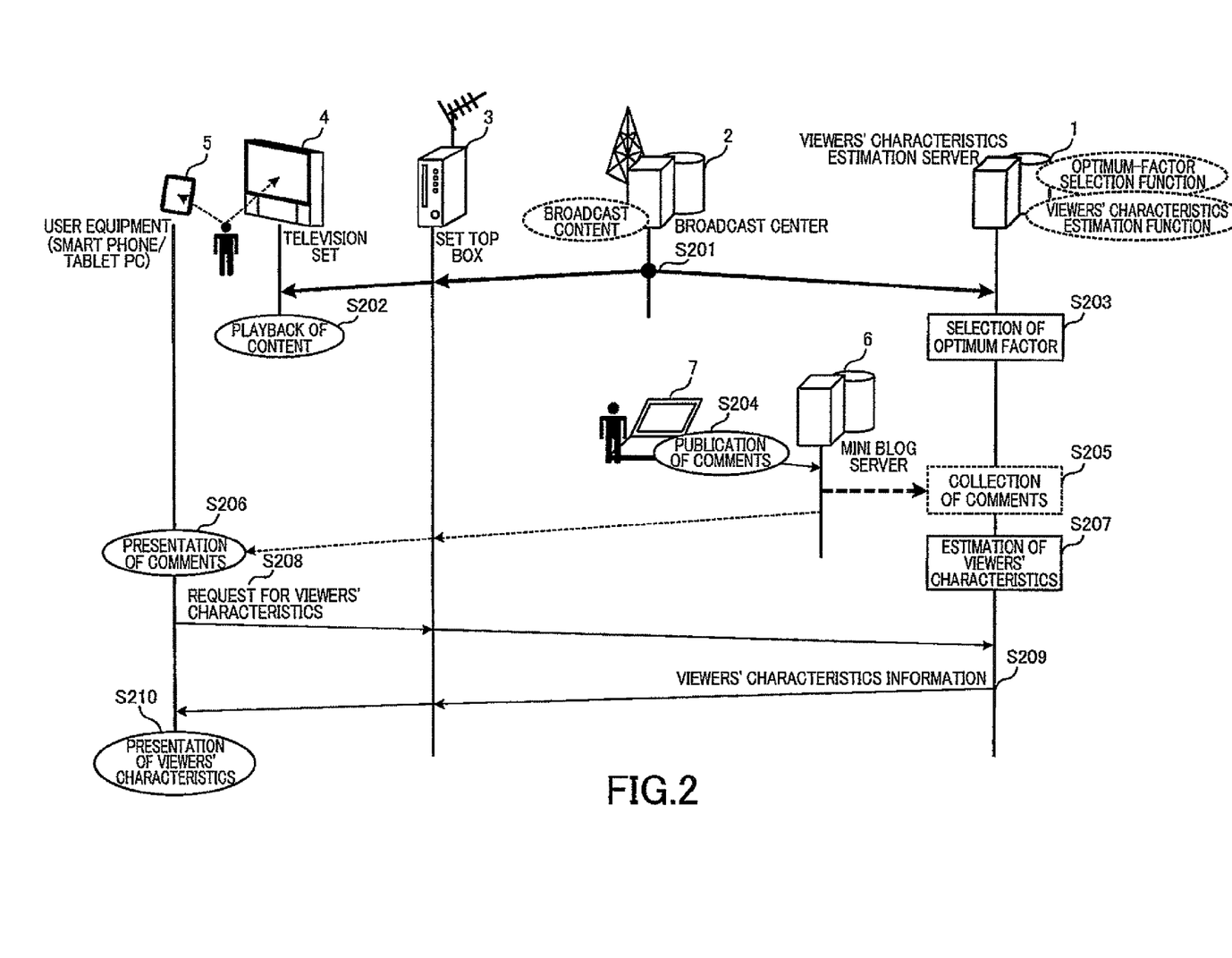
FIG. 2 is a sequence diagram for explaining how the system depicted in FIG. 1 operates.

FIG. 2 is a sequence diagram for explaining how the system according to the present embodiment as illustrated in FIG. 1 operates.

Figure 3:
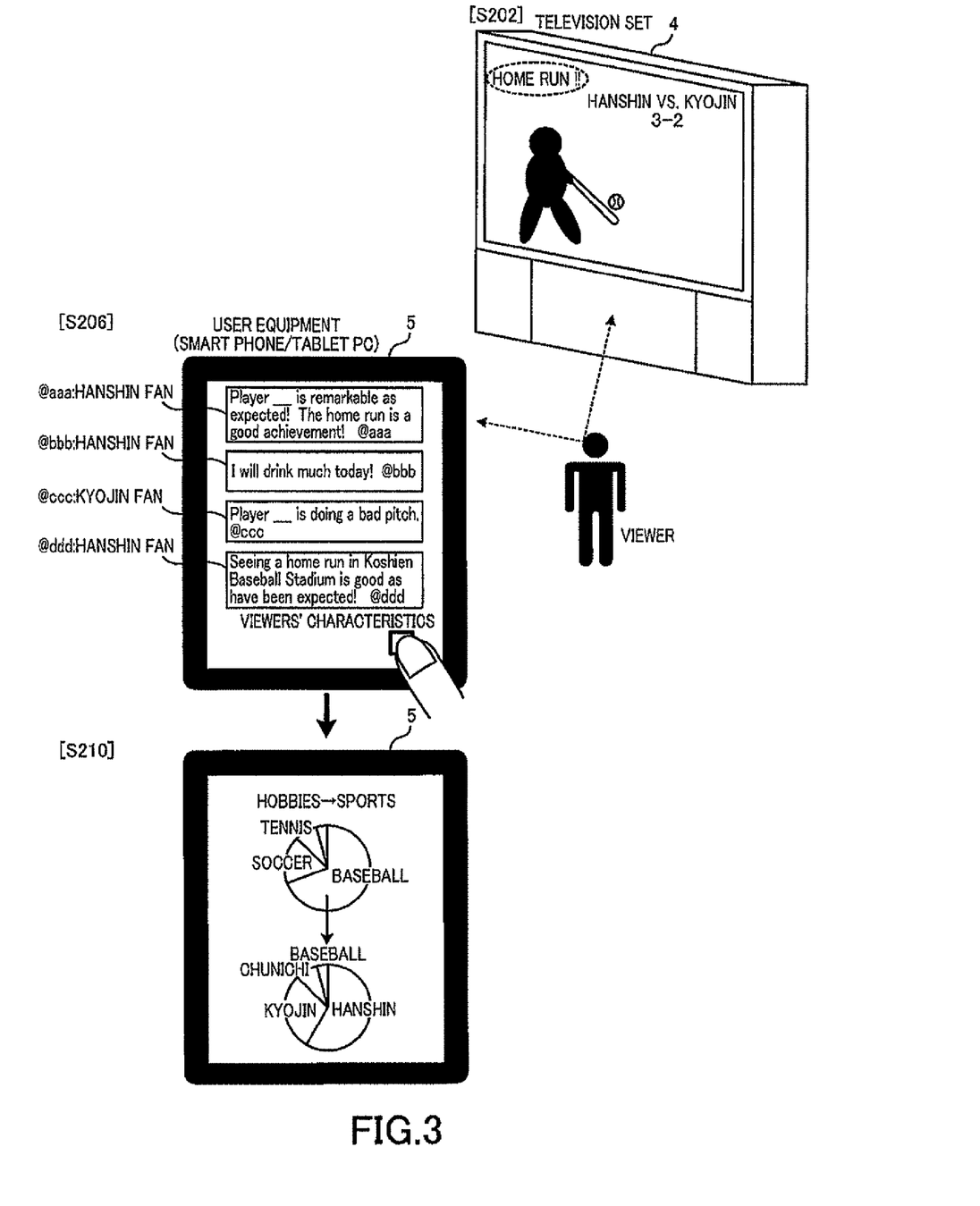
FIG. 3 is a front view illustrating an exemplary set of time-varying information displayed on a display screen of a portable user equipment depicted in FIG. 1, in response to a user action on the user equipment, together with a video scene displayed by a television set depicted in FIG. 1.

FIG. 3 is a front view illustrating an exemplary set of time-varying information displayed on a display screen of the user equipment 5, in response to a user action on the user equipment 5, together with a video scene displayed by the television set 4.

Now, the operation of the system will be described with reference to FIGS. 2 and 3 below in time series.

(S201)

The broadcast center 3 distributes broadcast content to an unspecified large number of potential viewers. Then, the set top box 3 receives the broadcast content via air wave or the associated networks, and transfers the received broadcast content to the television set 4 which participates in the home network.

(S202)

The television set 4 plays back the received broadcast content, to enable the user to view the broadcast content on the display screen of the television set 4.

In an exemplary scenario depicted in FIG. 3 in association with the label "S202," on the display screen of the television set 4, a live sports TV program is displayed of a professional baseball game in Japan between Hanshin Tigers (simply as "Hanshin") vs. Yomiuri Giants (simply as "Kyojin") as exemplary shared broadcast content.

(S203)

The VCE server 1 selects an optimum factor for the broadcast content received from the broadcast center 2.

(S204)

Other viewers who are watching the same broadcast content as the user are watching operate their own general-purpose data terminals 7, to send to the mini blog server 6, their own personal comments on and relevant to the same broadcast content. Upon reception, the mini blog server 6 stores therein the received relevant comments, and then, publishes the relevant comments to an unspecified large number of others, on demand.

(S205)

The VCE server 1 collects from the mini blog server 6, comments relevant to the same broadcast content within a predetermined range (e.g., within a predetermined time duration, below a predetermined threshold of the total number of storable comments, etc.).

(S206)

If necessary, the user operates the user equipment 5 to receive from the VCE server 1, comments relevant to the same broadcast content. In an example, the same comments are shared between the viewers' characteristics estimation server 1 and the user equipment 5. Then, the user equipment 5 displays the received comments on the display screen, to allow the user's viewing or browsing of the other viewers' comments.

In an exemplary scenario depicted in FIG. 3 in association with the label "S206," the user equipment 5 displays on the display screen, comments which other viewers who are watching the same TV program of the professional baseball game as the user is watching, wrote and published on the professional baseball game.

(S207)

The VCE server 1 analyzes the received comments from the other viewers, based on the selected optimum factor, and classify the other viewers into groups based on the optimum factor, to thereby estimate the other viewers' characteristics, which will be referred to as viewers' characteristics information.

(S208)

If necessary, the user operates the user equipment 5 to send to the VCE server 1, a request for receiving the viewers' characteristics information from the VCE server 1.

(S209)

Upon reception, the VCE server 1 sends the viewers' characteristics information to the user equipment 5.

(S210)

Upon reception, the user equipment 5 displays the received viewers' characteristics information on the display screen, for the user's viewing.

In an exemplary scenario depicted in FIG. 3 in association with the label "S210," the user equipment 5 displays on the display screen, the characteristics of other viewers who are watching the same TV program of a professional baseball game that the user is watching through the television set 4.

In this scenario, there are upper and lower pie charts. The upper pie chart is for visual representation (e.g., graphical or numerical representation) of the proportions of segments of a subject audience (i.e., the other viewers), wherein the segments are obtained by segmenting the subject audience based on a viewer attribute "Sports (favorite sports)" which is subordinate to another attribute "Hobbies (favorite hobbies)." In contrast, the lower pie chart is for visual representation (e.g., graphical or numerical representation) of the proportions of segments of the same subject audience, wherein the segments are obtained by segmenting the subject audience based on a viewer attribute "Baseball (favorite professional baseball teams)" which is subordinate to the attribute "Sports."

In this scenario, the subject audience is segmented to show that a majority of the subject audience like baseball more than any other type of sports, and a majority of people who like baseballs like Hanshin more than any other professional baseball team in Japan.

Figure 4:
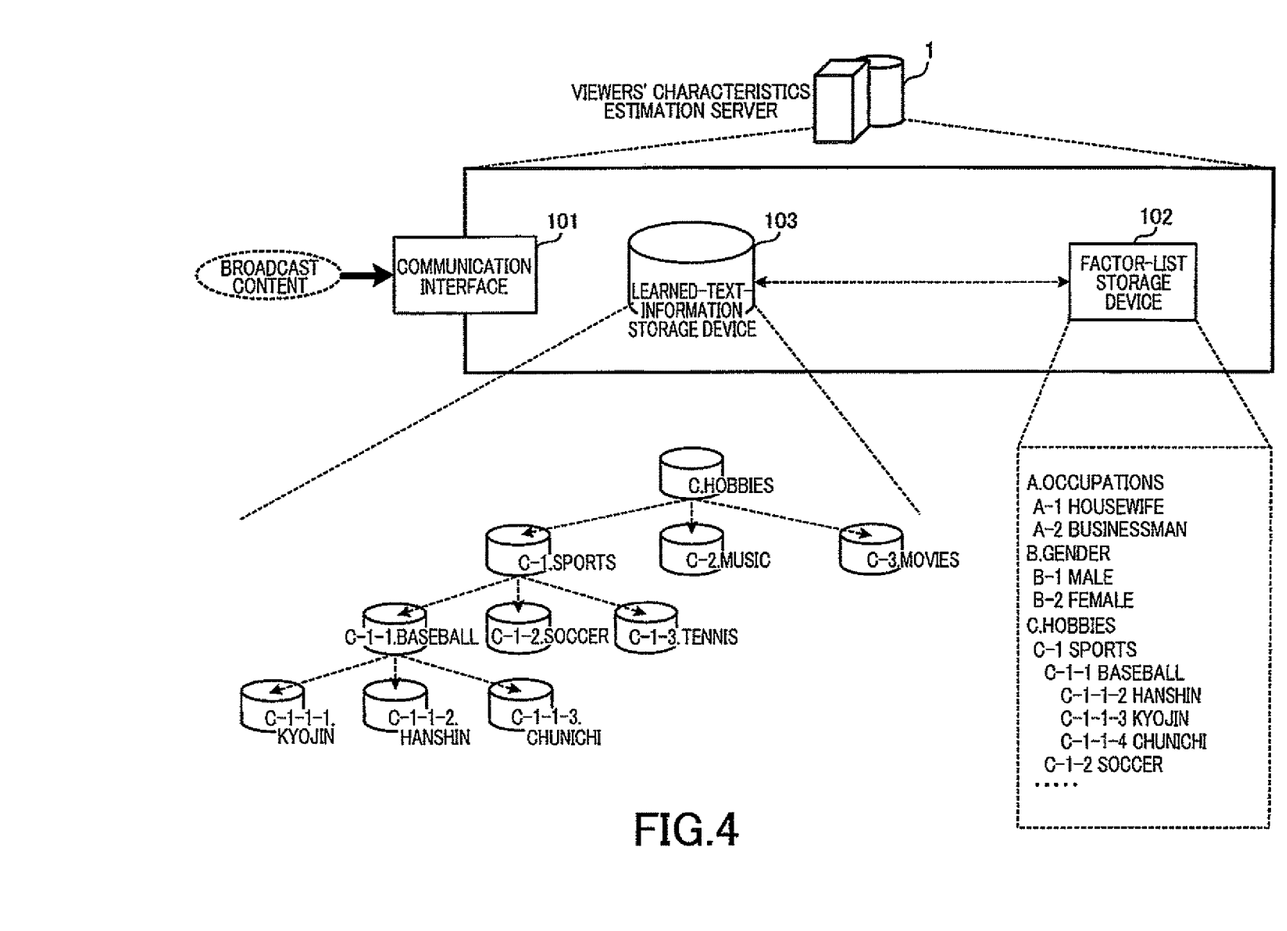
FIG. 4 is a view illustrating a learned-text information storage device and a factor-list storage device both of which belong to a viewers' characteristics estimation (VCE) server depicted in FIG. 1, together with an exemplary set of learned-text information stored in the learned-text information storage device, and an exemplary factor list stored in the factor-list storage device.

FIG. 4 is a view illustrating a learned-text information storage device 103 and a factor-list storage device 102 both of which belong to the VCE server 1 depicted in FIG. 1, together with an exemplary set of learned-text information stored in the learned-text information storage device 103, and an exemplary factor list stored in the factor-list storage device 102.

As illustrated in FIG. 4, the VCE server 1 is configured to have a communication interface 101 connected with the Internet, and the factor-list storage device 102 and the learned-text information storage device 103.

The factor-list storage device 102 has stored therein a plurality of pre-selected factors (i.e., a plurality of viewer attributes, such as habits, preferences or traits, each of which is a candidate of the optimum factor), and a plurality of words or terms that express the plurality of factors, respectively (hereinafter simply as "attribute words"). The attribute words together logically constitute a multi-layered hierarchic factor list having a plurality of layers. The factor-list storage device 102 has stored therein the factor list as conceptually illustrated in FIG. 4.

More specifically, each of the attribute words is allocated to one of a plurality of layers different in level or step, and the attribute words are allocated to a plurality of nodes in a hierarchic array forming a tree. In the hierarchic tree, a single-parent node laying on one of the layers, and a plurality of sibling child nodes laying on one step lower in the hierarchy, together form a single parent-child relationship (i.e., a nuclear family).

The hierarchic tree has a plurality of parent-child relationships. Each parent-child relationship has sibling child nodes which are allocated to a plurality of attribute words that form a single attribute class.

In an example illustrated in FIG. 4, factors laying on the first layer (i.e., a top-most layer) include "Occupation," "Gender" and "Hobbies."

In this example, factors laying on the second layer include "Housewife" and "Businessperson," which are child nodes sharing "Occupation" as the parent node, "Male" and "Female," which are child nodes sharing "Gender" as the same parent node, and "Sports" which is a child node having "Hobbies" as its parent node.

In this example, factors laying on the third layer include "Baseball" and "Soccer," which are child nodes sharing "Sports" as the same parent node.

In this example, factors laying on the fourth layer include "Hanshin," "Kyojin" and "Cyunich (standing for Chunich Dragons in Japan)," which are child nodes sharing "Baseball" as the same parent node.

The learned-text information storage device 103 is configured to store therein a plurality of sets of learned-text information which are relevant to the plurality of attribute words, in sections, on a per-attribute-word basis.

1. Optimum-Factor Selection Function

Figure 5:
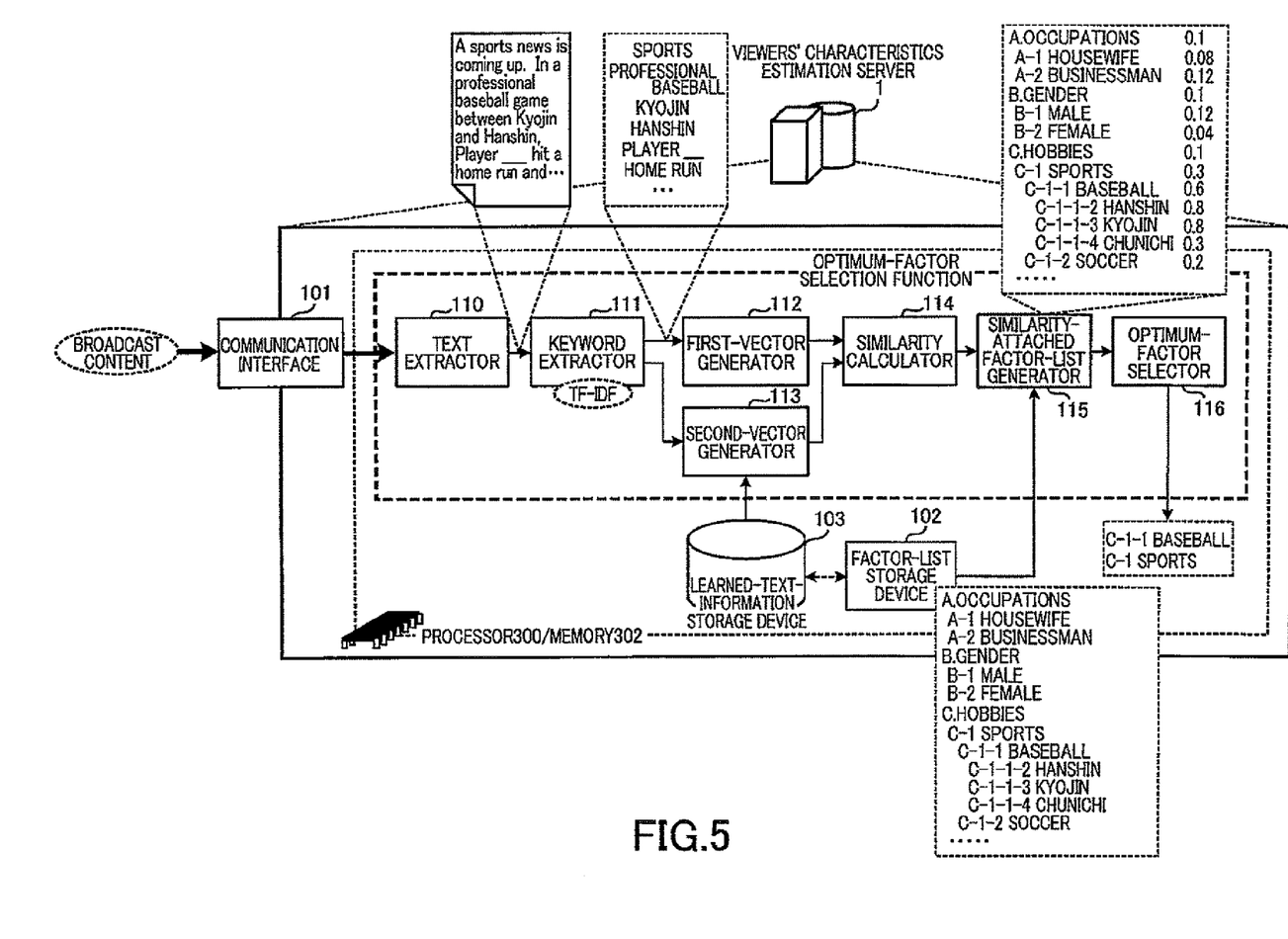
FIG. 5 is a functional block diagram conceptually illustrating the VCE server depicted in FIG. 1, detailing its optimum-factor selection function.

FIG. 5 is a functional block diagram conceptually illustrating the VCE server 1 depicted in FIG. 1, detailing its optimum-factor selection function.

As illustrated in FIG. 5, the optimum-factor selection function of the VCE server 1 is configured to include: a text extractor 110; a keyword extractor 111; a first-vector generator 112; a second-vector generator 113; a similarity calculator 114; a similarity-attached factor-list generator 115; and an optimum-factor selector 116.

These components are implemented by operating a processor 300 (e.g., a DSP (Digital Signal Processor), an FPGA (Field Programmable Gate Array), etc.) built in the VCE server 1 to execute a predetermined computer program (not shown) using a memory 302.

The text extractor 110 is configured to extract one or more text portions from the received shared content. Types and locations of the to-be-extracted text portions are pre-selected depending on the type of the shared content, for example, as follows:

| [Shared Content] | [Text Portions] |
|---|---|
| Broadcast TV content | Program Guide, Subtitles, Captions |
| Web Page | Tags, Body |
| Music | Tags, Lyrics |
| E-Book | Tags, Text |

Upon extraction, the text extractor 110 delivers the extracted text portions to the keyword extractor 111.

It is noted that, when the shared content takes the form of broadcast content, the to-be-extracted text portions may be, for example, a text contained in an iEPG (internet Electronic Program Guide), or a text contained in an Event Information Table of PSI/SI (Program Specific Information/Service Information) for a program stream.

The keyword extractor 111 is configured to extract a plurality of keywords from the extracted one or more text portions from the shared content, using morphological analysis.

By the morphological analysis, a given text (e.g., a given message) which is made of one or more strings of characters of natural language, is segmented into morphemes each of which is the smallest linguistic unit that has semantic meaning, and then, a part-of-speech of each morpheme is determined. The part-of-speech determination requires a dictionary having stored therein grammatical rules for a given language and part-of-speech-tagged words.

In an example, the keyword extractor 111 further evaluates how important each of the initially extracted keywords is to the shared content or a given document, using TF-IDF (Term Frequency-Inverse Document Frequency) weights or scores, to thereby select at least one of the initially extracted keywords each as a more important or distinctive keyword.

As well known in the art, the TF-IDF method is to represent a given user query as an weighted TF-IDF vector in a vector space, to represent a given document as an weighted TF-IDF vector in the vector space, to compute the cosine similarity score between the query and the document, and to rank the document with respect to the query by score. It is evaluated that the larger the score, the more important the query or a given keyword.

An example of the TF-IDF method is disclosed in the aforementioned Japanese Patent Application Publication No. 2008-048297, the content of which is incorporated hereinto by reference in its entirety.

The first-vector generator 112 is configured to generate a first vector ($w_j=(w_{j1}, w_{j2}, w_{j3}, \ldots, w_{jn})$). The first vector is indicative of frequencies (e.g., a number of times that a word appears in a document) with which the plurality of keywords (simply as "n keywords") occur in the shared content (i.e., content of interest). The first vector has a plurality of elements or dimensions to which the n keywords are allocated, respectively. The elements or dimensions have values indicative of the frequencies of the n keywords, respectively. The first vector is an n-dimensional term frequency vector defined in an n-dimensional coordinate space. The first vector is only one for the shared content.

The n keywords can be entirely or partially coincident with the plurality of candidate factors or attribute words contained in the factor list.

In an example, the first vector is defined as follows:

| Dimensions | [Baseball, | Soccer, | Kyojin, | Hanshin, | Tennis, | ...] |
|---|---|---|---|---|---|---|
| Frequencies | [ 15, | 2, | 8, | 11, | 0, | ...] |

The second-vector generator 113 is configured to successively generate a second vector ($w_g=(w_{g1}, w_{g2}, w_{g3}, \ldots, w_{gn})$), for a successively-selected one of the keywords. The second vector for the successively-selected keyword, is indicative of frequencies (e.g., a number of times that a word appears in a document) with which the n keywords occur in ones of the plurality of sets of learned-text information which contain an attribute word identical with the successively-selected keyword. The second vector has a plurality of elements or dimensions to which the n keywords are allocated, respectively. The elements or dimensions have values indicative of the frequencies of the n keywords, respectively.

The second vector is another n-dimensional term frequency vector defined in the n-dimensional coordinate space, and the second vector has the same sequence of elements or dimensions as the first vector. However, unlike the first vector, the second vector is generated on a per-keyword basis, and, for the shared content, the number of second vectors is the same as the number of the keywords, that is, n.

In an example, the second vector is defined as follows:

| When Successively-Selected Keyword is Baseball, | | | | | |
|---|---|---|---|---|---|
| Dimensions | [Baseball, | Soccer, | Kyojin, | Hanshin, | Tennis, ...] |
| Frequencies | [ 1215, | 10, | 320, | 280, | 4, ...] |

The similarity calculator 114 is configured to calculate a similarity score between the first and second vectors, for a successively-selected one of the n keywords, that is, on a per-keyword basis or per-attribute-word basis.

More specifically, the similarity calculator 114 calculates the similarity scores between the first and second vectors, in the form of cosine similarity scores. Each cosine similarity score, which is calculated on a per-keyword basis, refers to how similar or coherent the shared content (i.e., a first document) and the sets of learned-text information (i.e., a second document) are to each other on a per-keyword basis.

The cosine similarity scores indicate the similarity between the two vectors by relying on similarity in direction between the two vectors. As a result, each cosine similarity score varies depending on the directions of the vectors, such that, if the vectors have exactly the same direction (meaning that the two documents are exactly the same), then each cosine similarity score takes a maximum value of 1, if the vectors are perpendicular to each other (meaning that the two documents are independent of each other), then each cosine similarity score takes 0, and if the vectors have exactly the opposite directions (meaning that the two documents are exactly opposite to each other), then each cosine similarity score takes a minimum value of −1.

The similarity calculator 114 calculates each cosine similarity score by normalizing the inner product of the first and second vectors $w_j$, $W_g$, as follows:

$$\text{Similarity} = \cos\theta = (w_j \cdot w_g)/(|w_j||w_g|),$$

$$w_j \cdot w_g = \text{Inner product of vectors } w_j \text{ and } w_g,$$
$$= w_{j1}w_{g1} + w_{j2}w_{g2} + \ldots + w_{jn}w_{gn},$$

$$|w_j| = \text{Length or Norm of vector } w_j,$$
$$= \text{Euclidean distance from the coordinate origin to the end point of vector } w_j,$$
$$= sqrt\ (w_{j1}w_{j1} + w_{j2}w_{j2} + \ldots + w_{jn}w_{jn})$$

$$|w_g| = \text{Length or Norm of vector } w_g,$$
$$= \text{Euclidean distance from the coordinate origin to the end point of vector } w_g, \text{ and}$$
$$= sqrt\ (w_{g1}w_{g1} + w_{g2}w_{g2} + \ldots + w_{gn}w_{gn}).$$

The similarity-attached factor-list generator 115 is configured to generate a similarity-attached factor-list which is obtained by attaching the calculated cosine similarity scores to the corresponding respective factors or attribute words in the aforementioned factor list.

In an exemplary scenario depicted in FIG. 5, a similarity-attached factor list is generated which has a plurality of keywords (attribute words) extracted from subtitles (i.e., exemplary text portions) of a live broadcast TV program of a professional baseball gave between Hanshin and Kyojin (i.e., exemplary shared content).

The optimum-factor selector 116 is configured to select, on a per-layer basis, one of the plurality of factors as the optimum factor, if the one factor is associated with a sub-plurality of attribute words (i.e., an attribute class), which are on a lower layer than that of the one factor, and which are coincident with at least some of the plurality of keywords, and if a dispersion level (i.e., a similarity dispersion level) indicative of how the similarity scores calculated for the sub-plurality of attribute words are dispersed therewithin is substantially the maximum among the plurality of factors.

More specifically, the optimum-factor selector 116 calculates, on a per-layer basis, similarity dispersion levels for the attribute classes on one layer, and selects one of the attribute classes which has the highest similarity dispersion level among them, as an optimum attribute class.

In this regard, each similarity dispersion level is a measurement of how similarity scores are dispersed, wherein the similarity scores have been calculated for attribute words which are allocated to sibling child nodes belonging to each attribute class.

Then, the optimum-factor selector 116 selects as an optimum factor, one of the plurality of factors in the factor list, if the one factor is allocated to a parent node shared by sibling child nodes belonging to the optimum attribute class, and selects as optimum attribute words for the optimum factor, some of the attribute words in the factor list, if the some attribute words belong to the optimum attribute class.

In an example, the optimum-factor selector 116 compares similarity dispersion levels among attribute classes on the same layer, on a per-layer basis:

$\cos \theta_1$ for $L_1$, $\cos \theta_2$ for $L_2$, ..., and $\cos \theta_m$ for $L_m$, where "m" refers to the total number of layers.

In an example, the optimum-factor selector 116 operates as follows:

In an exemplary scenario depicted in FIG. 5, on the first layer, all the factors "Occupation," "Gender" and "Hobbies" have the same similarity scores, meaning that there is no difference in similarity. However, in this scenario, the shared content is a baseball game broadcast, and therefore, "Hobbies" is selected.

"Hobbies" on the first layer is superior to "Sports" on the second layer, and "Sports" is superior to "Baseball" and "Soccer" on the third layer. Because "Baseball" is larger in similarity score than "Soccer," "Baseball" is selected.

"Baseball" on the third layer is superior to "Hanshin," "Kyojin" and "Cyunichi," each as a sibling child node, and if the similarity dispersion level within these three child nodes is higher than that of other child nodes which are superior to "Soccer," "Baseball" is selected.

Thus, in this scenario, "Hobbies" is selected for the first layer, "Sports" is selected for the second layer, and "Baseball" is selected as an optimum factor for the third layer, in succession, on a per-layer basis. For "Baseball," "Hanshin," "Kyojin" and "Cyunichi" are selected as optimum attribute words which are subordinate to "Baseball."

2. Viewers' Characteristics Estimation Function

Figure 6:
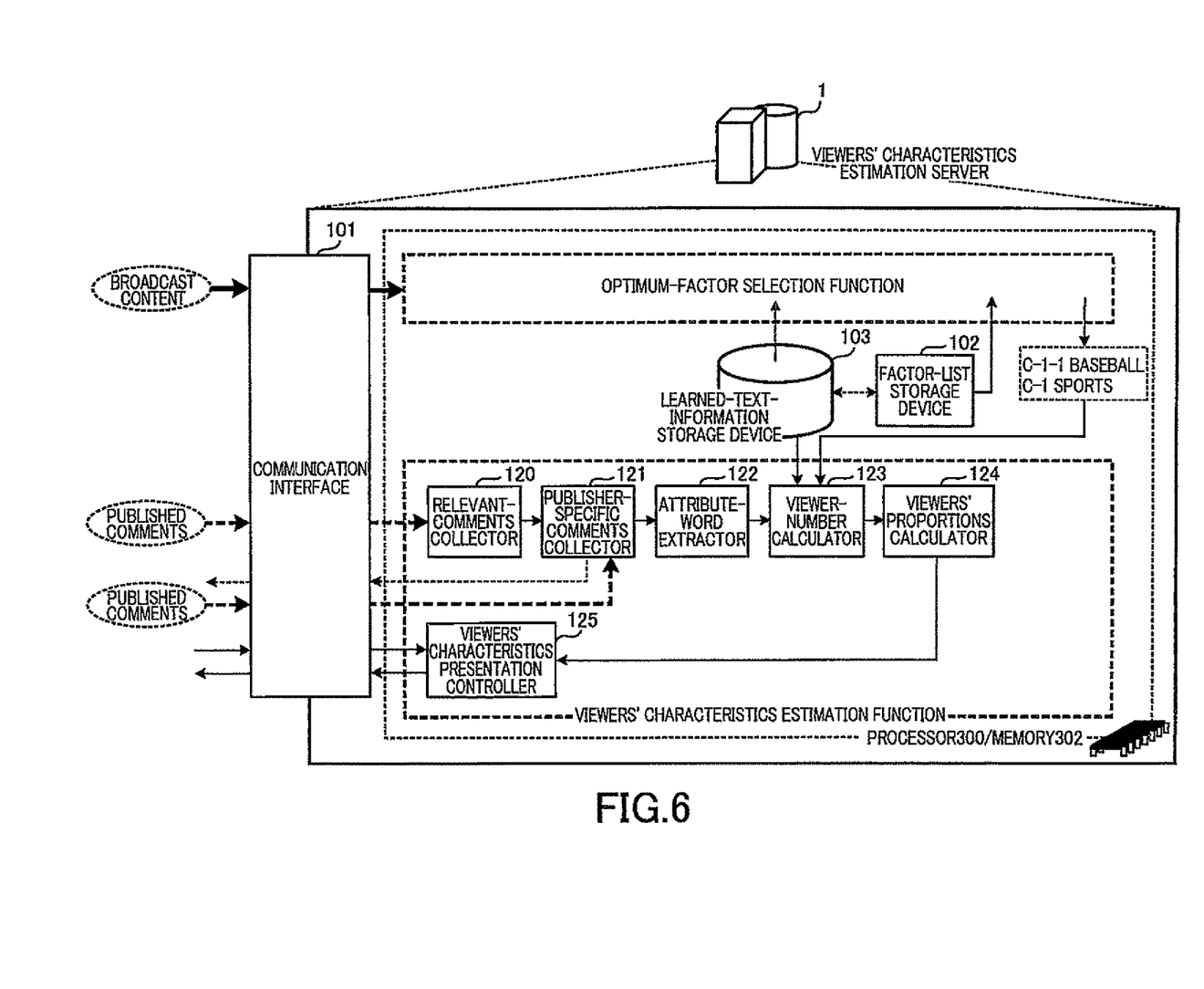
FIG. 6 is a functional block diagram conceptually illustrating the VCE server depicted in FIG. 1, detailing its viewers' characteristics estimation function.

FIG. 6 is a functional block diagram conceptually illustrating the VCE server 1, detailing its viewers' characteristics estimation function.

As illustrated in FIG. 6, the viewers' characteristics estimation function of the VCE server 1 is configured to include a relevant-comments collector 120; a publisher-specific comments collector 121; an attribute-word extractor 122; a viewer-number calculator 123; a viewers' proportions calculator 124; and a viewers' characteristics presentation controller 125.

As stated above, these components are also implemented by operating the processor 300 built in the VCE server 1 to execute a predetermined computer program (not shown) using the memory 302.

As well known in the art, each comment is associated with a unique publisher identifier (ID) for identifying a publisher who publishes the each comment. When Twitter (registered trademark) is used by publishers, each comment is associated with a unique caller identifier (ID).

The relevant-comments collector 120 is configured to collect a plurality of comments within a predetermined range, which are relevant to the shared content from, for example, the mini blog server 6. The predetermined range may be a notion for limiting a time during which the relevant-comments collector 120 can collect relevant comments, or a notion for limiting a maximum number of comments that the relevant-comments collector 120 can collect. In any event, the collected comments are delivered to the publisher-specific comments collector 121.

The publisher-specific comments collector 121 is configured to sort the collected comments by the publisher ID. In an exemplary preferable implementation, the publisher-specific comments collector 121 is also configured to trace back and collect additional previous comments which were made by the same publishers, with reference to the publisher IDs, from, for example, the mini blog server 6. This allows estimation of the publishers' profiles with the maximum accuracy on a per-publisher basis. The comments that have been sorted by the publisher ID are delivered to the attribute-word extractor 122.

The attribute-word extractor 122 is configured to extract some of the plurality of attribute words from the collected comments on a per-publisher-ID basis. The plurality of attribute words are contained in the factor list, and when an attribute word is contained in a comment made by a publisher, the attribute word can represent the publisher's profile. The attribute-word extractor 122 may be implemented using techniques disclosed in the aforementioned Article "Scalable and General Method to Estimate Blogger Profile." The disclosed technique enables estimation of a blogger profile based on a flexibly-selected factor, despite that the learned-text information is used as supervise data.

The extracted attribute words are delivered to the viewer-number calculator 123.

The viewer-number calculator 123 is configured to operate for a successively-selected one of the attribute words which belong to the optimum factor and which are on a lower layer than that of the optimum factor, to calculate as a viewer number, the number of ones of the publishers who published ones of the plurality of comments which contain the successively-selected attribute word.

In this regard, the viewer number for each attribute word can be replaced with the number of publisher IDs of comments containing each attribute word. In an exemplary preferable implementation, the lower layer is one of the layers which is one step lower than that of the optimum factor. The calculated viewer numbers are delivered to the viewers' proportions calculator 124 in association with the respective attribute words.

In an exemplary scenario depicted in FIG. 5 in which "Baseball" is selected as an optimum factor, "Hanshin," "Kyojin" and "Cyunichi" on one step lower layer, sharing "Baseball," are selected as optimum attribute words, and the viewer numbers are counted for these attribute words, respectively.

The viewers' proportions calculator 124 is configured to calculate proportions of segments into which the plurality of viewers are segmented based on the optimum factor, to thereby estimate characteristics of the plurality of viewers, as in, for example, an exemplary scenario labeled as "S210" in FIG. 3. The calculated proportions, serving as the viewers' characteristics information, are delivered to the viewers' characteristics presentation controller 125.

The viewers' characteristics presentation controller 125 is configured to send the viewers' characteristics information to the user equipment 5, in response to a request issued from the user equipment 5 by the user who needs the viewers' characteristics information. Upon reception, the user equipment 5 displays the received viewers' characteristics information, as in, for example, an exemplary scenario labeled as "S210" in FIG. 3.

It is noted that, in an alternative scenario, the learned-text information storage device 103 is configured to receive comments from the mini blog server 6 and store therein the received comments as the plurality of sets of learned-text information.

In this scenario, when Twitter is used, publishers' profiles are associated with their publisher IDs. Each publisher's profile contains various keywords such as "Gender," "Age," "Birthplace," and "Residence." A publisher's profile provides people who read the profile, with a rough idea about the publisher's characteristics.

Therefore, in this scenario, when Twitter is used, the learned-text information storage device 103 collects a plurality of comments from the mini blog server 6, and extracts some of the plurality of attribute words included in the factor list, from profiles of publishers who made the comments.

Further, the learned-text information storage device 103 stores therein the comments in association with the corresponding respective attribute words, with the comments serving as some of the plurality of sets of learned-text information.

This allows the system to use up-to-date comments as the sets of learned-text information, and eliminates the need for special additional sets of learned-text information.

Next, a similar system according to a second illustrative embodiment of the present invention will be described with reference to FIG. 7 conceptually illustrating the VCE server 1 in a functional block diagram.

The present embodiment is similar in construction to the first embodiment except for the VCE server 1. The VCE server 1 in the present embodiment is similar with the VCE sever 1 in the first embodiment, but the VCE server 1 in the present embodiment has a factor optimization function in addition to the optimum-factor selection function and the viewers' characteristic estimation function. The optimum-factor selection function in the present embodiment is modified from that of the first embodiment.

Factor Optimization Function

Figure 7:
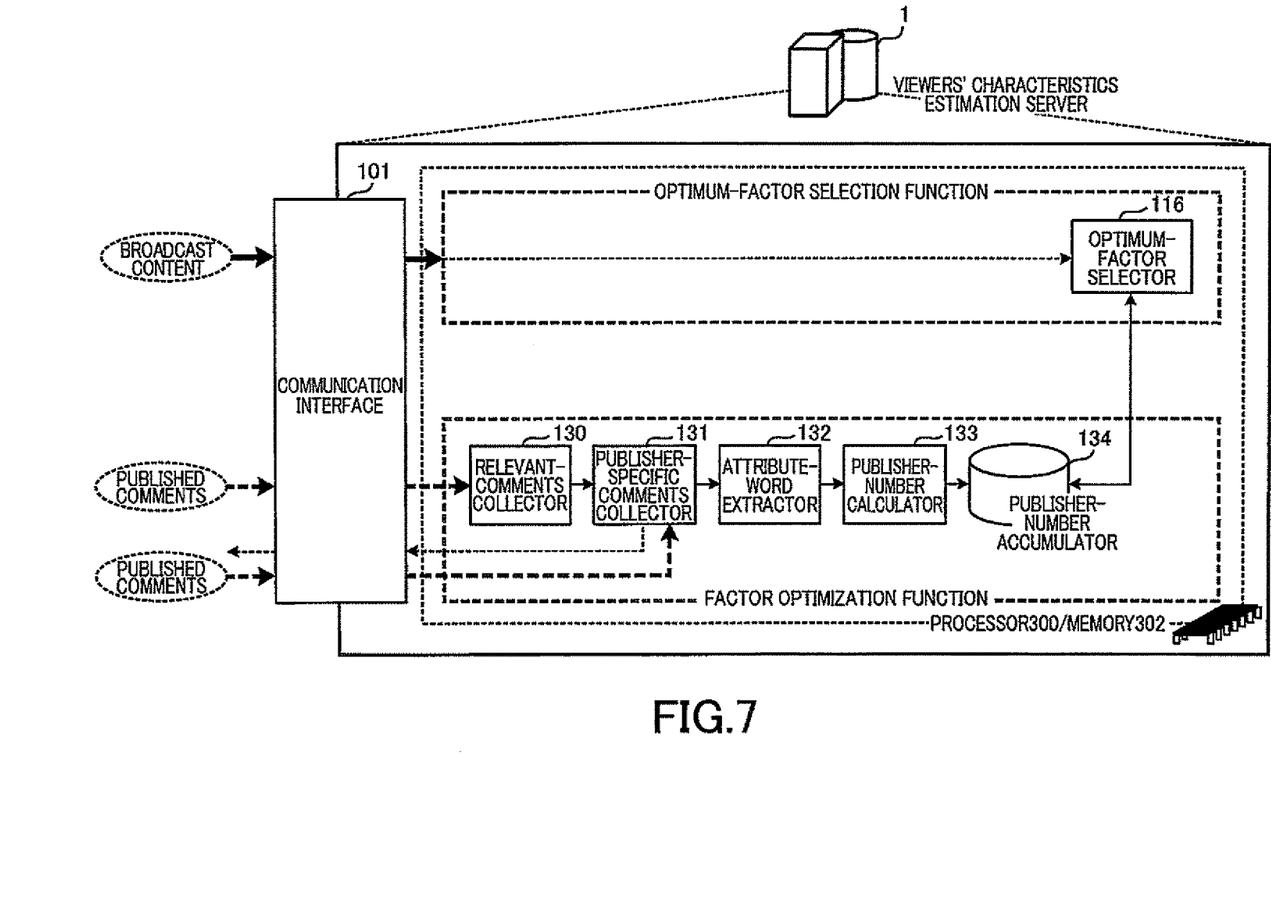
FIG. 7 is a functional block diagram conceptually illustrating a VCE server in a system according to a second illustrative embodiment of the invention, detailing its factor optimization function.

FIG. 7 is a functional block diagram conceptually illustrating the VCE server 1, detailing its factor optimization function.

As illustrated in FIG. 7, the VCE server 1 has the factor optimization function working in cooperation with the modified optimum-factor selection function.

When the factor optimization function is provided, the number of publishers who posted comments containing each attribute word and who are watching the same shared content is repeatedly counted as a publisher number, on a per-attribute-word basis, at time intervals, and then, a temporal change (e.g., a difference of a current value from a previous value) in the publisher number is repeatedly calculated on a per-attribute-word basis, at time intervals.

When the modified optimum-factor selection function is provided, one of the plurality of factors (i.e., single-parent nodes) as an optimum factor is selected, based on a dispersion level indicative of how the similarity scores calculated for attribute words belonging to each factor (i.e., an attribute class, that is, sibling child nodes sharing the same single-parent node) are dispersed therewithin, and based on temporal changes in the publisher numbers calculated for the attribute words for each factor.

In comparison with the first embodiment, the modified optimum-factor selection function in the present embodiment is similar with the optimum-factor selection function in the first embodiment in that selection of an optimum factor depends at least on differences in the similarity dispersion levels between the attribute classes, which reflect the context of the shared content, except that, in the present embodiment, selection of an optimum factor depends additionally on a temporal change in the publisher number for each attribute word.

As illustrated in FIG. 7, the factor optimization function of the VCE server 1 is configured to include a relevant-comments collector 130; a publisher-specific comments collector 131; an attribute-word extractor 132; a publisher-number calculator 133; and a publisher-number accumulator 134.

As stated above, these components are also implemented by operating the processor 300 built in the VCE server 1 to execute a predetermined computer program (not shown) using the memory 302.

As described above, each comment is associated with a unique publisher identifier (ID) for identifying a publisher who publishes the each comment. When the aforementioned Twitter is used by publishers, each comment is associated with a unique caller identifier (ID).

The relevant-comments collector 130 is similar in configuration with the relevant-comments collector 120, except that the relevant-comments collector 130 repeatedly collects a plurality of comments which are relevant to the shared content from, for example, the mini blog server 6, at time intervals.

In this regard, each of the "time intervals" refers to a period or a repetition cycle time which may be a unit time having any desired length, for example, five minutes. As described below, the number of publishers who published comments having some of the attribute words in the factor list, is repeatedly measured at the same time intervals, and a temporal change in the publisher number is repeatedly measured, on a per-publisher basis, at the same time intervals.

The collected comments by the relevant-comments collector 130 are delivered to the publisher-specific comments collector 131.

The publisher-specific comments collector 131 is configured to sort the collected comments by the publisher ID, like the publisher-specific comments collector 121. The comments that have been sorted by the publisher ID are delivered to the attribute-word extractor 132.

The attribute-word extractor 132 is configured to extract some of the plurality of attribute words from the collected comments on a per-publisher-ID basis, like the attribute-word extractor 122. The attribute-word extractor 132 may be implemented using techniques disclosed in the aforementioned Article "Scalable and General Method to Estimate Blogger Profile." The extracted attribute words are delivered to the publisher-number calculator 133.

The publisher-number calculator 133 is configured to operate for a successively-selected one of the attribute words in the factor list, to calculate as a publisher number, the number of ones of the publishers who published ones of the plurality of comments which contain the successively-selected attribute word.

In this regard, the publisher number for each attribute word can be replaced with the number of publisher IDs of comments containing each attribute word. The calculated publisher numbers are delivered to the publisher-number accumulator 134 in association with the respective attribute words.

The publisher-number accumulator 134 is configured to receive the calculated publisher numbers and accumulate the publisher numbers in association with the respective attribute words, at time intervals. The accumulated publisher numbers are referenced by the optimum-factor selector 116.

The optimum-factor selector 116 is configured to select one of the plurality of factors as an optimum factor, so that a dispersion level indicative of how the similarity scores calculated for attribute words belonging to the one factor are dispersed therewithin, can be substantially maximized, and so that temporal changes in the publisher numbers for the attribute words for the one factor, can be substantially maximized.

In the present embodiment, the selection of an optimum factor depends on not only differences in the similarity dispersion between attribute classes, but also temporal changes in the publisher numbers for attribute words, for the following reasons:

In the above-described exemplary scenario illustrated in FIG. 3, the shared content is a "broadcast of a professional baseball game between Hanshin and Kyojin."

In this scenario, if "Baseball" is selected as an optimum factor, and "Hanshin," "Kyojin" and "Cyunichi" are selected as optimum attribute words, it is likely that, if a batter in Hanshin hits a home run, many comments will be posted by people who have an attribute of a Hanshin fan, meaning that Hanshin fans more enjoy the baseball game than Kyojin fans as of one time. On the other hand, if a batter in Hanshin struck out swinging, it is likely that many comments will be posted by people who have an attribute of a Kyojin fan, not a Hanshin fan, meaning that Kyojin fans more enjoy the baseball game than Hanshin fans as of another time.

This shows that, in this scenario, how many of Hanshin fans who post their comments and how many of Kyojin fans post their comments vary with time (as a baseball game develops), and therefore, attributes "Hanshin" and "kyojin" and their superior attribute, that is, "Baseball" are viewer attributes more attractive to all the viewers or an audience.

Thus, if an attribute word is selected from the factor list, and if the number of viewers who post their comments having the selected attribute word varies with time, then the selected attribute word is good in segmenting the audience into segments.

In contrast, in the same scenario, if "Age" is selected as an optimum factor, and "Teenage," "Twenties" and "Thirties" are selected as optimum attribute words, then it is likely that the number of people who are teenage and who post their comments, the number of people who are in their twenties and who post their comments, or the number of people who are in their thirties and who post their comments, does not vary with time.

Thus, if an attribute word is selected from the factor list, and if the number of viewers who post their comments having the selected attribute word does not vary with time, then the selected attribute word is not good in segmenting the audience into segments.

As will be evident from the foregoing, in the present embodiment, a factor for use in estimating the characteristics of viewers who are watching the same content is automatically selected depending on the context of the same content. Further, based on the factor, comments that were made by the audience are contextually analyzed, to thereby segment the audience into segments based on the factor.

As a result, the audience is segmented into segments, based on a factor which reflects the context of the same content, to thereby estimate the audience's characteristics, so that it can attract the audience to the possible maximum.

Further, in the present embodiment, the user equipment 5 enables the user who is watching shared content, to identify an audience who are watching the same shared content, and therefore, the user can identify comments that were made by the identified audience, not subjectively but objectively.

Meanwhile, a technique of using comments made by an audience is helpful in segmenting the audience into segments and estimating the audience's characteristics.

In an example, this technique, if combined with well-known reputation evaluation techniques, could allow collection of segment-specific views, which are helpful in targeting new services on a segment-by-segment basis. In addition, this can help us distinguish between views of different segments, for example, a housewife segment and views of a businessperson segment.

In another example, this technique, if implemented in the TV broadcasting realm, could allow segmentation of an audience by analyzing comments made by the audience, without conducting any survey for the audience.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of selecting an optimum factor for use in estimating characteristics of a plurality of viewers who view a same content, the method being implemented by a computer including a processor and a memory, the method comprising:

storing in the memory, by the processor, a multi-layered hierarchal factor-list of a plurality of pre-selected factors each of which is a candidate of the optimum factor, the factors being a plurality of attribute words which express attributes of the viewers, the factor list having a plurality of layers;

storing in the memory, by the processor, a plurality of sets of learned-text information which are relevant to the plurality of attribute words, in sections, on a per-attribute-word basis, the sets of learned-text information including a plurality of comments which were published by the plurality of viewers, the comments being relevant to the context of the same content;

extracting, by the processor, a plurality of keywords from the same content;

generating, by the processor, a first vector indicative of frequencies with which the plurality of keywords occur in the same content, the first vector having a plurality of elements which the plurality of keywords are allocated, respectively, the elements having values indicative of the frequencies of the plurality of keywords, respectively;

for a successively-selected one of the keywords, successively generating, by the processor, a second vector indicative of frequencies with which the plurality of keywords occur in ones of the plurality of sets of learned-text information which ones contain an attribute word identical with the successively-selected keyword, the second vector having a plurality of elements which the plurality of keywords are allocated, respectively, the elements having values indicative of the frequencies of the plurality of keywords, respectively;

calculating, by the processor, a similarity score between the first and second vectors on a per-keyword basis;

successively (1) selecting, by the processor, one of the plurality of layers from the factor list, by moving through the plurality of layers of the factor list in a direction from a top-most layer to a bottom-most layer, and on a per-layer basis, (2) selecting, by the processor, one of the plurality of factors as the optimum factor, wherein the one factor is associated with a sub-plurality of attribute words, which are on a lower layer than that of the one factor, and coincident with at least some of the plurality of keywords, so that a dispersion level indicative of how the similarity scores calculated for the sub-plurality of attribute words are dispersed therewithin can be substantially the maximum among the plurality of factors on the same layer, and (3) selecting, by the processor, the sub-plurality of attribute words as optimum attribute words for the optimum factor; and analyzing, by the processor, the comments based on the selected optimum factor, thereby segmenting the plurality of viewers based on the selected optimum factor to estimate the viewers' characteristics.

2. The method according to claim 1, wherein the calculating includes calculating the similarity score by normalizing an inner product of the first and second vectors, in the form of a cosine of an angle between the first and second vectors.

3. The method according to claim 1, wherein the extracting includes performing morphological analysis for a text part of the same content, to thereby extract the plurality of keywords from the text part, and optionally includes calculating a TF-IDF (Term Frequency-Inverse Document Frequency) score for each of the extracted key words, to thereby select at least one of the extracted keywords which is more distinct from any other keyword, each as a final keyword.

4. The method according to claim 1, wherein
the same content is broadcast television content having an audiovisual part and a text part contextually relevant to the audiovisual part, and
the extracting includes extracting the plurality of keywords from the text part.

5. The method according to claim 1, wherein the analyzing the comments comprises:
at time intervals, collecting a plurality of comments which were published by the plurality of viewers acting also as publishers, which comments are relevant to the context of the same content, and each of which comments is associated with a unique publisher identifier (ID);
collecting and sorting the plurality of comments by the publisher ID; and
extracting some of the plurality of attribute words from the plurality of comments on a per-publisher-ID basis;
at time intervals, for each successively-selected one of the plurality of attribute words, calculating as a publisher number, a number of the publishers who published ones of the plurality of comments which contain the successively-selected attribute word,
wherein the selecting includes selecting one of the plurality of factors as the optimum factor, based on a dispersion level calculated for each factor, and temporal changes in the publisher numbers calculated for the sub-plurality of attribute words for each factor.

6. The method according to claim 1, wherein the analyzing the comments comprises:
collecting a plurality of comments which were published by the plurality of viewers acting also as publishers, which comments are relevant to the context of the same content, and each of which comments is identified by a unique publisher identifier (ID);
collecting and sorting the plurality of comments by the publisher ID; and
extracting some of the plurality of attribute words from the plurality of comments on a per-publisher-ID basis;

for each successively-selected one of the optimum attribute words, calculating as a viewer number, a number of the publishers who published ones of the plurality of comments which contain the successively-selected optimum attribute word; and
based on the calculated viewer numbers, calculating proportions of segments into which the plurality of viewers are segmented based on the optimum factor, to thereby estimate characteristics of the plurality of viewers.

7. The method according to claim 6, wherein the lower layer is one of the plurality of layers which is one step lower than that of the optimum factor in the hierarchy.

8. The method according to claim 6, wherein
the plurality of comments are comments sent to a mini blog (Web log) site, and
the collecting a plurality of comments and the collecting the plurality of comments each include collecting the plurality of comments from the mini blog site.

9. The method according to claim 8, wherein the collecting the plurality of comments includes tracing back and collecting additional previous comments which were made by the same publishers.

10. The method according to claim 8, wherein
the sets of learned-text information include a plurality of comments,
the comments are relevant or irrelevant to the same content,
the comments are identified by the corresponding respective publisher IDs, the comments are sent to the mini blog site,
the comments are associated with profiles of the corresponding respective publishers,
the associated profiles are identified by the corresponding respective publisher IDs, and
the storing a plurality of sets of learned-text information includes:
collecting the plurality of comments with the associated profiles, the comments and the associated profiles being identified by the corresponding respective publisher IDs; extracting the plurality of attribute words from the profiles; and
storing the comments in association with the extracted attribute words from the corresponding associated profiles, as the sets of learned-text information.

11. The method according to claim 1, wherein the factor list is configured such that a single-parent node on one of the layers, and sibling child nodes which share the single-parent node, and which are on one step lower layer than that of the single-parent node, together constitute a single parent-child relationship, and such that sibling child nodes in each parent-child relationship together constitute a single attribute class,
the selecting includes selecting an optimum attribute class from a plurality of attribute classes, on a per-layer basis, the optimum attribute class is constituted by sibling child nodes, which are allocated attribute words that are coincident with at least some of the plurality of keywords, and which has substantially the maximum dispersion level of the similarity scores among a plurality of attribute classes on a same layer as that of the optimum attribute class, and
the selecting further includes selecting one of the plurality of factors in the factor list, which is allocated to a single-parent node shared by sibling child nodes which together constitute the optimum attribute class.

12. An apparatus for selecting an optimum factor for use in estimating characteristics of a plurality of viewers who view a same content, the apparatus comprising:

a factor-list storage device for storing therein a multi-layered hierarchal factor-list of a plurality of pre-selected factors each of which is a candidate of the optimum factor, the factors being a plurality of attribute words which express attributes of the viewers, the factor list having a plurality of layers;

a learned-text storage device for storing therein a plurality of sets of learned-text information which are relevant to the plurality of attribute words, in sections, on a per-attribute-word basis, the sets of learned-text information including a plurality of comments which were published by the plurality of viewers, the comments being relevant to the context of the same content;

an extractor configured to extract a plurality of keywords from the same content;

a first-vector generator configured to generate a first vector indicative of frequencies with which the plurality of keywords occur in the same content, the first vector having a plurality of elements which the plurality of keywords are allocated, respectively, the elements having values indicative of the frequencies of the plurality of keywords, respectively;

a second-vector generator configured to operate for a successively-selected one of the keywords, to successively generate a second vector indicative of frequencies with which the plurality of keywords occur in ones of the plurality of sets of learned-text information which ones contain an attribute word identical with the successively-selected keyword, the second vector having a plurality of elements which the plurality of keywords are allocated, respectively, the elements having values indicative of the frequencies of the plurality of keywords, respectively;

a similarity calculator configured to calculate a similarity score between the first and second vectors on a per-keyword basis;

an optimum-factor selector configured to (1) move through the plurality of layers of the factor list in a direction from a top-most layer to a bottom-most layer, (2) select, on a per-layer basis, one of the plurality of factors as the optimum factor, wherein the one factor is associated with a sub-plurality of attribute words, which are on a lower layer than that of the one factor, and which are coincident with at least some of the plurality of keywords, so that a dispersion level indicative of how the similarity scores calculated for the sub-plurality of attribute words are dispersed therewithin can be substantially the maximum among the plurality of factors on the same layer, and (3) select the sub-plurality of attribute words as optimum attribute words for the optimum factor; and a viewers' characteristics estimator configured to analyze the comments based on the selected optimum factor, thereby segmenting the plurality of viewers based on the selected optimum factor to estimate the viewers' characteristics.

13. A computer-readable non-transitory storage medium having stored therein a program which, when executed by a computer, effects the method according to claim 1.

14. A method of selecting an optimum factor for use in segmenting a plurality of viewers who view a same content, the method comprising:

generating, by a computer, a first vector indicative of one or more features of the same content;

generating, by the computer, a second vector indicative of one or more features of each of the viewers, using corresponding one or more of a plurality of comments published by the viewers when the viewers view the same content;

calculating, by the computer, a similarity score between the first vector and the second vector for each one of a plurality of candidate factors of the optimum factor;

successively selecting as a current layer, by the computer, one layer from a plurality of layers of a multi-layered hierarchal factor-list, by moving through the plurality of layers of the factor list in a direction from a top-most layer to a bottom-most layer, each of the layers having a corresponding sub-plurality ones of the plurality of candidate factors, each candidate factor of the current layer corresponding to a sub-plurality ones of a plurality of subordinate candidate factors of a subordinate layer to the current layer:

successively selecting as a current superior candidate factor, by the computer, one candidate factor from a plurality of candidate factors of the current layer;

for the current superior candidate factor of the current layer, calculating, by the computer, a dispersion level indicative of how the similarity scores calculated for a sub-plurality ones of the plurality of subordinate candidate factors of the subordinate layer to the current layer, the sub-plurality ones corresponding to the current superior candidate factor;

when a determination that the dispersion levels calculated for the plurality of superior candidate factors of the current layer are dispersed to have substantially the greatest value among the dispersion levels is made by the computer, selecting as the optimum factor, by the computer, one of the plurality of superior candidate factors of the current layer, the one superior candidate factor being substantially the greatest in the dispersion level; and segmenting, by the computer, the plurality of viewers based on the selected optimum factor.

15. A computer-readable non-transitory storage medium having stored therein a program which, when executed by a computer, effects the method according to claim 14.

* * * * *